Dec. 12, 1939.   T. B. ALLARDICE   2,182,862
SEPARATING METHOD AND APPARATUS
Filed April 10, 1934   4 Sheets-Sheet 1
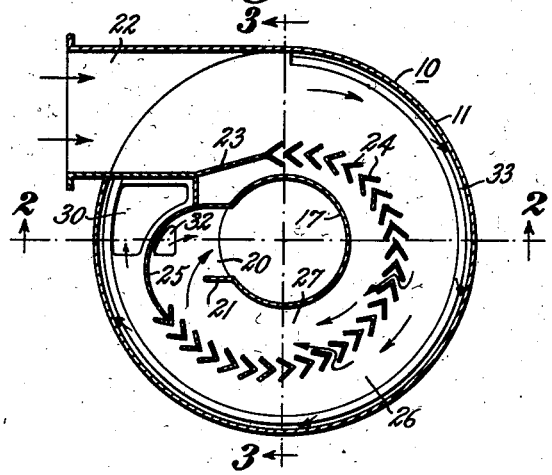
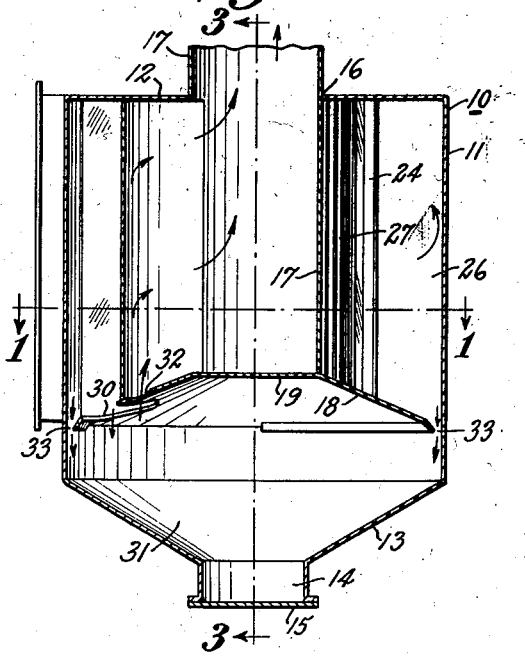
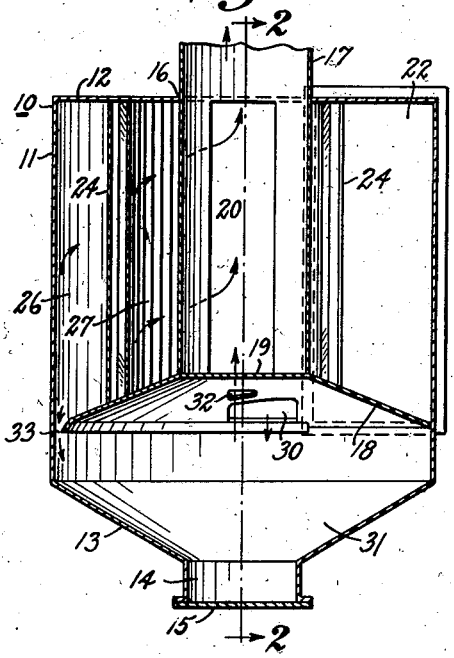
INVENTOR
THOMAS B. ALLARDICE
BY
ATTORNEY Dec. 12, 1939.  T. B. ALLARDICE  2,182,862
SEPARATING METHOD AND APPARATUS
Filed April 10, 1934  4 Sheets-Sheet 2
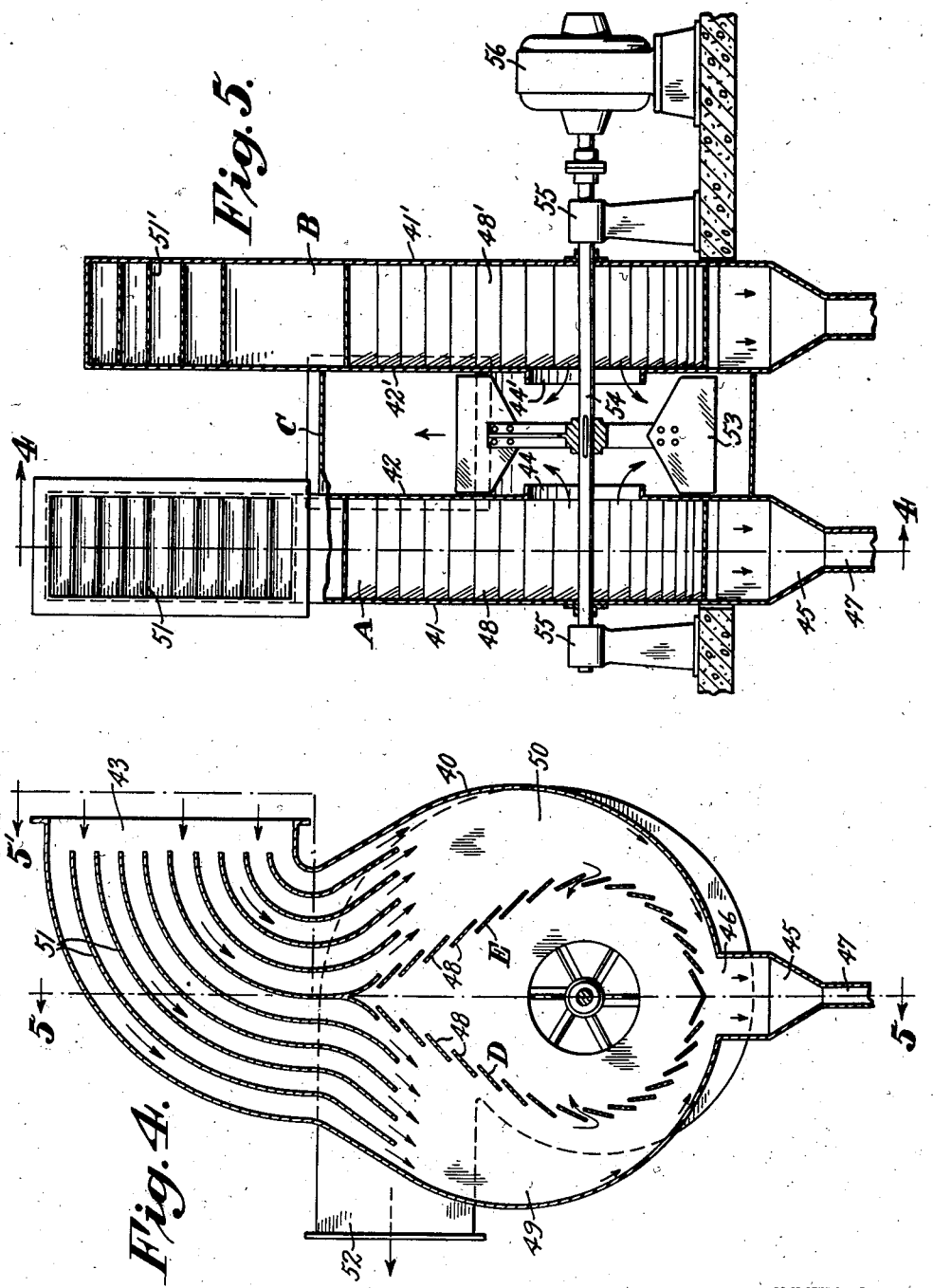
INVENTOR
THOMAS B. ALLARDICE
BY
ATTORNEY

INVENTOR
THOMAS B. ALLARDICE
BY
ATTORNEY

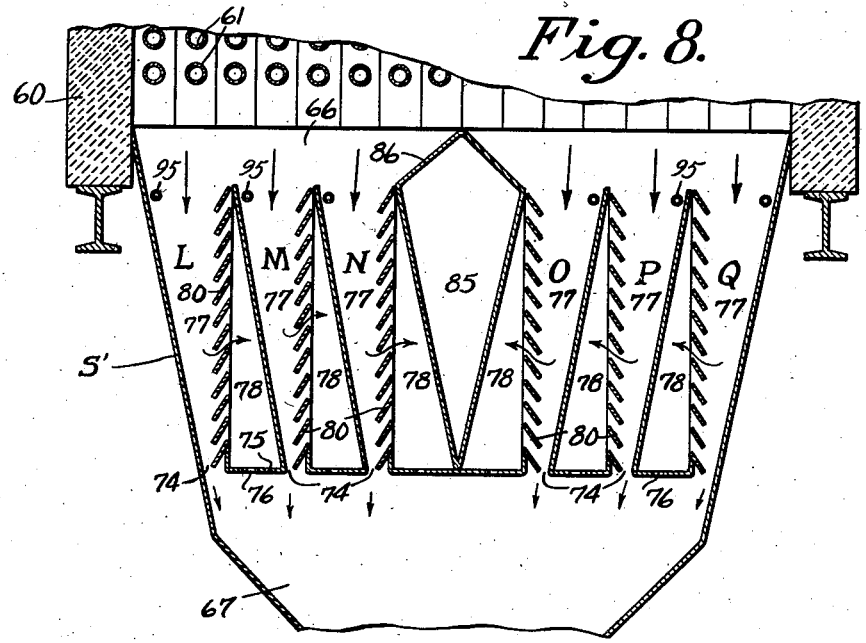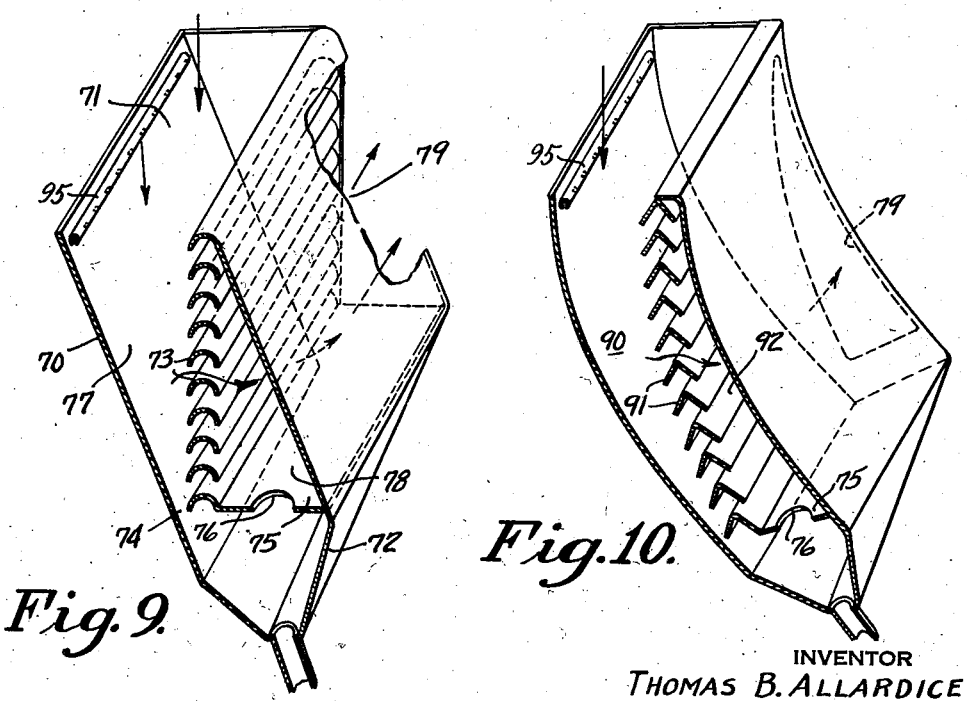

Patented Dec. 12, 1939

2,182,862

UNITED STATES PATENT OFFICE 2,182,862

SEPARATING METHOD AND APPARATUS

Thomas B. Allardice, Mountain Lakes, N. J.

Application April 10, 1934, Serial No. 719,837

18 Claims. (Cl. 183—79)

This invention relates to separating systems and more particularly pertains to methods and apparatus for separating solid matter from gases carrying the same in suspension to either purify the gases or collect the solid matter, or both.

The purpose of the invention is to provide a novel method of separating gases and the solid matter carried in suspension and compact and efficient apparatus for carrying out the method.

This is accomplished, in general by causing the dust laden gases to flow in one or more streams through one or more curved or straight paths of diminishing flow area, continuously separating gas from each stream during its passage through the flow path, causing the separated gas portions at the moment of separation to abruptly change their direction of flow to free them from the dust particles carried thereby, arranging the path or paths of flow so that each provides a path of gradually diminishing flow area to thereby maintain the velocity of the gases and solids moving through each path substantially constant so that the inertia of the solid particles may be utilized to aid in the separating action, and collecting the separated solid matter. The separating apparatus may be combined or associated with means, such as a flue, stack or fan for providing the pressure differential to induce the flow of the dust laden gases through the paths of flow, and in order to obtain compactness of the separating apparatus.

The nature of the invention will be understood from the following description considered in connection with the accompanying drawings forming a part thereof and in which:

Fig. 1 is a transverse sectional view of separating apparatus embodying the present invention taken substantially on line 1—1 of Fig. 2;

Fig. 2 is a longitudinal sectional view on lines 2—2 of Figs. 1 and 3;

Fig. 3 is another longitudinal sectional view on lines 3—3 of Figs. 1 and 2;

Fig. 4 is a sectional view of another form of separating apparatus embodying the invention taken on line 4—4 of Fig. 5;

Fig. 5 is a sectional view taken on line 5—5 and line 5—5' of Fig. 4;

Fig. 8 is a sectional view similar to Fig. 7 showing a somewhat different arrangement of the elements of the separating apparatus;

Fig. 9 is a perspective view of a separating unit having a straight flow path; and Fig. 10 is a similar perspective view of a separating unit having a curved path of flow.

Like characters of reference designate like or similar parts throughout the several views.

Figure 6:
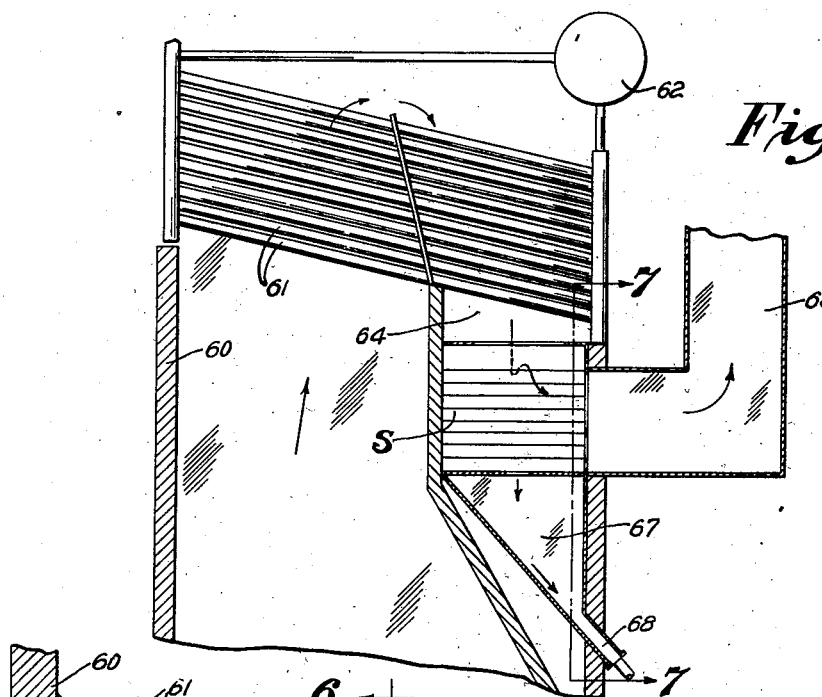
Fig. 6 is a diagrammatic view in elevational section showing another form of separating apparatus embodying the invention and utilized with a boiler.

Referring to the form of invention shown in Figs. 1 to 3 of the drawings, reference character 10 designates generally a separator casing of cylindrical form. Casings other than cylindrical may be utilized, if desired. The casing is provided with an outer cylindrical wall 11 which is closed at its upper end by a wall 12 and at its lower end by a generally cone-shaped wall 13 having an outlet 14 closed by a cover 15 which may be detachably fastened to the outlet. The upper wall 12 is provided with a circular aperture 16, as shown, to receive a flue or stack 17. An apron 18, in the shape of a frustrum, is disposed in the casing 10 a short distance above the lower end of the cylindrical wall 11. As illustrated, the casing is arranged relative to the stack or flue 17 so that the lower end of the stack is located at the upper plane portion 19 of the apron 18, although it will be understood that the stack or flue may continue down through the lower end of the casing, if desired. In lieu of placing the casing around the stack or flue, obviously the casing may be provided with an inner cylindrical wall, such as indicated as 17, which may be connected to the stack or flue at any convenient point. The stack or flue or the wall 17 as the case may be, is provided with longitudinal opening 20 which extends from the upper wall 12 of the casing to the apron 18. The stack or wall 17 is provided with a laterally and outwardly extending flange 21 which projects into the flow path 27 hereinafter described.

The casing 10 is provided with a tangential inlet 22 into which gases carrying solid matter in suspension therein are introduced into the casing. The separator casing is provided with a curved inner wall spaced from the outer wall 11 and which provides a path of flow for the gases and solids of gradually diminishing flow area. This inner curved wall consists of a plate 23 adjacent the inner end of the inlet 22, a plurality of spaced baffle plates 24 and a curved plate 25 extending from one side of the opening 20 in the flue or wall 17 to the baffles 24. These plates 23 and 25 and the baffles 24 extend between the upper wall 12 and the apron 18. As shown the baffle plates are V-shaped in transverse cross-section and are disposed parallel to the axis of the separator casing and in a plane curved so that the baffles adjacent the plate 23 and adjacent the inlet 22 are farther from the cylindrical outer wall 11 than the other end of the row of baffles adjacent the plate 25 thereby providing a path of flow 26 between these baffles 24 and the outer cylindrical wall 11 of the casing or gradually diminishing area of flow. The particular disposition of the curved inner wall is such that the gases and solids flow through the inlet path 26 without material diminution of velocity irrespective of the separations of gases from the main stream through the spaces between the baffle plates. The baffle plates 24 are disposed so that the apices of the baffle plates face in a direction opposite to the direction of flow of the stream of gases passing through the aforesaid path 26. Other types of baffle plates may of course be utilized and their arrangement may be different from that illustrated, so long as the baffle plates are spaced apart and disposed so that the gases in flowing from the path 26 between the baffles shall abruptly change their direction of flow. The inner curved wall formed in part of the baffles 24 provides, with the stack or wall 17, a curved outlet flow path 27 of gradually increasing area of flow toward the opening 20 in the stack or wall 17.

Apron 18 is provided with an opening 30 disposed at the end of the path of flow 26 and in the pocket defined by the wall 11, a wall of the inlet 22, the plate 23 and the plate 25. This opening may be of any desired size to permit the passage of gases and solid matter from the path 26 into the settling chamber or hopper 31. Apron 18 is also provided with an opening 32 adjacent the opening 20 of the stack or wall 17 and disposed between the wall 25 and the opening 20. This opening ordinarily may be smaller than the opening 30 but should be sufficiently large to permit the flow therethrough of all of the gases which enter the hopper from the path 26. The apron 18 is arranged so that it is spaced from the wall 11 of the casing preferably from the point at which the inlet 22 joins the wall 11 to the opening 30 in the apron thereby providing a slot 33 through which said matter separated from the gases flowing through the path 26 may drop down into the hopper 31. Obviously, in lieu of spacing the apron from the wall 11, the apron may contact with the wall 11 and a suitable opening may be provided therein which will perform the function of permitting the solid matter to drop into the hopper.

The operation is as follows: Assuming that the stack or flue 17 is operating so as to provide a lower pressure at the opening 20 than at the inlet 22 of the casing, gases carrying dust or other solid matter in suspension and introduced into the inlet 22 will flow through the path 26 toward the opening 30 in the apron. The inertia of the solid matter will cause it to hug the cylindrical wall 11 of the casing in its passage through the path 26. Some of this solid matter, due to its weight, will drop down toward the apron 18 and will pass through the slot 33 into the hopper 31. In the course of the passage of the gases through the path 26 and due to the lower pressure existing at the outlet 20 than at any point in the path of flow 26, portions of the stream of gases will continually be separated from the main stream and withdrawn between the baffle plates 24. When this separation occurs the gases separated from the main stream will be forced to abruptly change their direction of flow in order to separate therefrom the solid particles due to the inertia of the latter. The gases so separated flow through the outlet path 27 between the baffle plates 24 and the stack or wall 17 and will pass through the outlet 20 into the stack. Due to the fact that path 26 is of gradually diminishing flow area the velocity of the gases flowing through the path will not be materially diminished because of the separation of part of the gases therefrom. In this manner the solid matter which does not drop down through the slot 33 is concentrated into the gases remaining in the path of flow 26 and these flow to the end of the path of flow through the opening 30 and into the hopper 31 where the carrying gases abruptly change their direction of flow from a downward to an upward direction and flow out through the opening 32 into the outlet 20 and to the stack 17. Due to this abrupt change in direction of flow of the gases in the hopper, the solids are separated therefrom and are collected in the hopper 31. The solid matter may be withdrawn from the hopper through the outlet 14.

In the form of the invention shown in Figs. 4 and 5 the separator casing is arranged to provide a plurality of curved paths of flow for the gases and the solid matter carried thereby and a fan is utilized to cause the flow of the gases through the separator. As shown in these figures, two separator casings are utilized, with the fan and its casing disposed between the two.

The separator casings are designated A and B and the fan casing is designated C. Casings A and B are identical except for the reversal of their outlets so that it will be necessary to describe casing A only. The corresponding parts of casing B will be designated by the same reference characters as applied to casing A but with the addition of a prime to each character. Separator casing A has a curved wall 40 and side walls 41 and 42. As illustrated, the casing is disposed with its axis horizontal but it may be disposed so that its axis is vertical, if desired. The casing is provided with an inlet 43, which, as shown, is in the form of a right angle elbow and causes the gas introduced into the casing to be discharged toward the center thereof. The casing is provided with an outlet 44 in the central portion of wall 42, through which the clean gas is passed from the casing A into the fan casing C. A hopper or collecting chamber 45 is disposed at the bottom of the casing and communicates with the casing through an opening 46 in the curved wall 40. A pipe 47 connected to the bottom of the hopper provides means for withdrawing therefrom solid matter introduced into the hopper. A plurality of spaced baffle plates 48 are disposed in the casing between the side walls 41 and 42 and about the outlet opening 44 to provide a plurality, two as shown, of paths of flow for the gases and the solids carried thereby of gradually diminishing flow area from the upper end of the casing A to the hopper 45. One row D of baffles 48 extends from a point centrally of the upper end of the casing to a point somewhat above the lower end of the casing at its central point and is curved so that the path of flow 49 between these baffle plates 48 and the curved wall 40 is of gradually diminishing flow area from the upper end of the casing to the lower end. Another row E of baffle plates 48 is disposed similarly to the disposition of the row D but reversed so as to provide a path of flow 50 on the other side of the casing. The rows D and E of baffles are in contact at their upper ends and at their lower ends, as shown. As shown, the baffle plates 48 are short, relatively narrow flat plates and are disposed so that the gases in flowing between them, are constrained to abruptly change their direction of flow to separate the solid matter therefrom. Other forms of baffle plates may be used if desired. These rows of baffles should be so disposed relative to the curved wall 40 that the velocity of the gases flowing through the paths 49 and 50 will not be materially diminished due to the separation of portions of these streams of gases during their flow through these paths. The inlet 43 is provided with a plurality of spaced curved plates 51 which act as guide vanes and serve to more or less equally distribute the gases entering the inlet 43 into the several paths of flow in the separator casing.

The separator casings A and B are disposed on opposite sides of a fan casing C as shown. Casing C is provided with a tangential outlet 52. Any suitable type or form of fan such as shown at 53 may be employed. This fan is mounted on a shaft 54 which is journalled in bearings 55 disposed at the sides of the separator casings. The fan may be driven by any suitable means as the electric motor 56, shown.

The operation is as follows: Assuming that the fan 53 is operating so as to provide a lower pressure at the outlets 44 and 44' of the casings A and B than at their inlets, gases carrying dust or other solid matter introduced into the inlets 43 and 43' will flow between the guide vanes 51 and 51' and enter the flow paths 49 and 50 in each casing. Due to the curvature of the paths of flow 49 and 50, the solid matter carried by the gases will flow toward and hug the cylindrical wall 40 of the casing in each path of flow because of the inertia of the solid matter. Portions of the gases flowing through the paths of flow will continually be withdrawn through the spaces between the baffle plates 48 and in passing between these plates, the gases so separated will be caused to abruptly change their direction of flow thereby freeing the gases from the solid matter carried thereby because of the inertia of the solid matter. The separated gases flow through the outlets 44 and 44' into the fan casing C and are discharged by the fan through the outlet 52. The solid matter is thereby concentrated into a small portion of the gases entering the paths of flow and these small gas portions together with the solids continue to flow through these paths to the end of each above the hopper 45 where they come in contact with each other. This contact causes the gases and solids to abruptly change their direction of flow, with some of the gases flowing between the baffles 48 and some flowing into the hopper 45. The solids, due to the arrangement of the baffles 48, are substantially all collected in the hopper 45. Such gases as flow into the hopper are freed from the solids carried thereby due to their abrupt change in direction of flow in the hopper from which they flow to and through the spaces between the baffles above the hopper due to the suction produced by the fan 53. These gases then flow through the outlets 44 and 44' into the casing C and are forced out through the outlet 52 to any desired point.

It will be understood that any number of paths of flow may be provided in a single separator without transcending the principle of the invention. It will further be understood that the arrangement shown in Figs. 1 to 3 may be utilized with a fan, if desired, and that the arrangement shown in Figs. 4 and 5 may be utilized with a stack or flue.

In the form of the invention shown in Figs. 6 to 9, straight paths of flow for the gases and solid matter carried thereby are provided. Fig. 10 shows the same general arrangement as Fig. 9 but with a curved inlet path of flow. Although the arrangements of these forms of the invention are particularly well adapted to boiler installations, it will be understood that they are capable of use in other environments.

Figure 7:
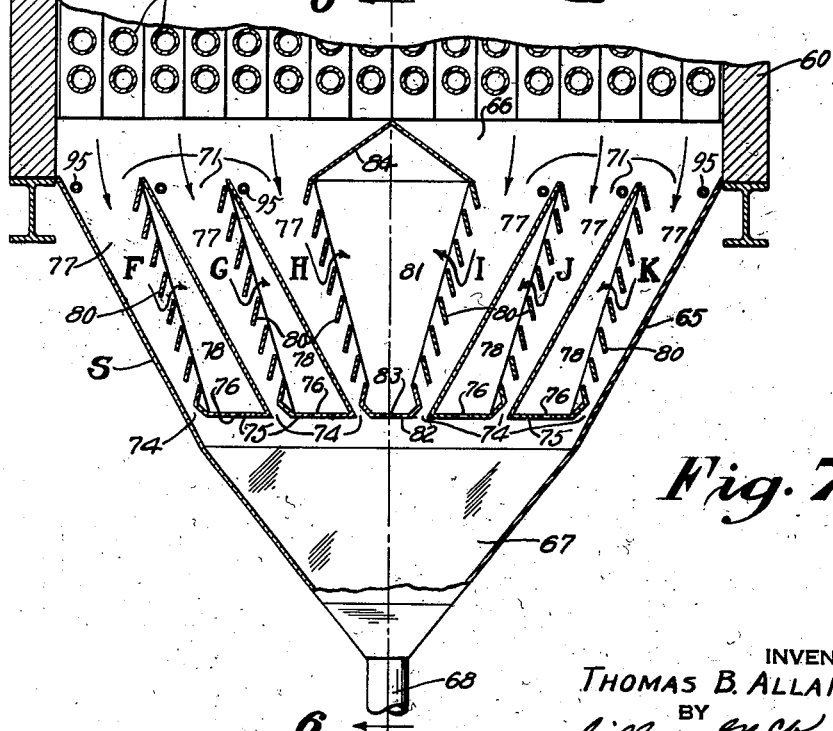
Fig. 7 is a sectional view, on an enlarged scale, taken on line 7—7 of Fig. 6.

Referring particularly to Figs. 6 and 7, reference character 60 designates the setting of a boiler having a bank of water tubes 61, a steam and water drum 62 and a flue 63 connected to the second gas pass 64 of the boiler. A separator, designated S, and embodying the invention is disposed in the second pass 64 so as to receive the products of combustion in its inlet and discharge the gases, freed of solid matter into the flue 63. The separator S comprises a housing 65 having parallel end walls and converging side walls. The housing has an inlet 66 at its upper end and a hopper 67 at its lower end with a draw off 68 for the solid material deposited in the hopper. The separator S consists essentially of a plurality of separator units such as shown in Fig. 9, operating in parallel. These units comprise a housing 70, rectangular in form as shown, having an inlet 71 at its upper end and a hopper 72 at its lower end. A tier of spaced baffle plates 73 extends diagonally across the housing from the upper right hand side toward the lower left, as shown, but terminating just short of the latter to provide a narrow hopper inlet passage 74. The baffle plates shown in Fig. 9 consist of elongated, semi-circular plates, extending from end to end of the housing and disposed concavely downward. Any other suitable type of baffle plate may be utilized, if desired. The baffle plates in each tier are spaced apart a distance sufficiently to cause the gases which are separated from the main stream and flow between the baffle plates to materially diminish their velocity at the time of separation from the main stream to thereby aid in the separation of the gases and solid matter. A plate 75 having an aperture 76 extends across the top of the hopper 72 from the lower end of the tier of baffle plates to the opposite side of the housing. With this arrangement, a downwardly directed inlet flow path 77 of gradually diminishing area of flow is provided from the inlet 71 to the hopper 72 and an outlet flow path 78 on the opposite side of the baffles 73, through which the gases passing between the baffles and the aperture 76 flow toward and through the triangular shaped housing outlet 79.

The operation will be apparent. Assuming that the separator housing is connected with means providing the pressure differential necessary to cause flow through the separator, gases laden with solid matter will enter the inlet 71 and flow vertically downward in a straight path of flow of gradually diminishing flow area directly toward the hopper 72. Portions of the stream of gases flowing through the inlet path 77 will continually be separated therefrom on the baffle side of the stream and caused to flow between the baffles 73 thereby abruptly changing their direction of flow and due to the inertia of the solid matter, will be separated therefrom. Due to the diminishing area of flow the remaining gases and solid matter in the main stream will continue preferably at undiminished velocity toward the hopper and will flow through passage 74 thereinto. The gases entering the hopper will abruptly change their direction of flow in the hopper from a downward to an upward direction, thereby being freed of any remaining solid matter which will be deposited in the hopper, and will then flow toward and through the aperture 76 into the outlet flow path 78 where they will mix with the gases flowing between the baffle plates and the mixture will flow through outlet 79 to be disposed of as desired. Because the greatly enlarged flow area for the gases in passing between the baffle plates, the velocity of the gases at the time of their change of direction for passage between the baffle plates will be materially diminished. This material reduction in velocity together with the inertia of the solid particles and the abrupt change in direction results in a clean separation of the gases and solid matter. The vertical inclination of the tier of baffle plates is preferably such that with the desired degree of separation of the gases from the main stream on the baffle side thereof, the velocity of the remaining gases and solid matter flowing through the inlet path 77 will be practically undiminished throughout the inlet flow path. With this arrangement and method of operation, a clean separation of the gases and solid matter is obtained.

Reverting now to Figs. 6 and 7, it will be seen that the separator S consists essentially of six separator units, such as shown in Fig. 9, arranged for parallel operation. The several units are designated F, G, H, I, J and K respectively. Units F, G, J and K are substantially the same as the unit shown in Fig. 9 and the elements thereof are designated with the same reference characters employed in Fig. 9. Instead of straight semi-circular baffle plates however, straight flat baffle plates 80 are used, although semi-circular or other suitable types of baffles may be used. The units H and I are the same as the other units except that they have a common outlet flow path 81. A plate 82 having an aperture 83 divides the lower end of the path 81 from the hopper 67 and an inverted V-shaped plate 84 covers the upper end of the path. A single hopper 67 is shown into which gases and solid matter are discharged from all the inlet flow paths, but separate hoppers may be employed for each unit if desired, or any other convenient number may be used. The operation of this multiple unit separator is practically the same as the operation of the single unit shown in Fig. 9 and previously described and need not here be repeated.

In Fig. 8, a multiple parallel unit separator is shown with all of the units like the unit shown in Fig. 9. The units are designated L, M, N, O, P and Q. With this arrangement, there is a dead space 85 between the units N and O with the upper end of the space defined by the inverted V-shaped plate 86. Here also straight baffle plates 80 are employed but other types may be used if desired.

In Fig. 10, a separator unit is shown similar to the unit shown in Fig. 9 except that a curved inlet flow path instead of a straight path is employed. In this arrangement, the inertia of the solid particles of matter carried by the gases causes them to move downwardly through the inlet path 90 in substantially straight line from which the curved line of baffle plates 91 gradually becomes more distant thereby diminishing the tendency of the solid particles to be carried with the gases between the baffles 91. The flow path 90 is preferably of gradually diminishing flow area to maintain the velocity throughout the path 90 substantially constant. The baffles 91 are V-shaped with their apices disposed upwardly, but other types of baffle plates may be utilized if desired. With the exception noted, the operation of this form of unit is substantially the same as that shown in Fig. 9. The unit of Fig. 10 may be disposed in a rectangular casing or the curved wall 92 may be straight. This unit may also be used with other similar units in the manner shown in Figs. 6 to 8.

It will be understood that the forms of separators shown in Figs. 6 to 10 may be used with the baffle plates extending in a vertical, rather than a horizontal direction, if desired.

If desired, the surfaces defining the paths of flow of the gases and solid matter carried in suspension thereby, with the exception of the baffle plates or their equivalent, may be sprayed with water. For this purpose, one or more pipes having suitably disposed apertures therein may be utilized in each inlet flow path. In Figs. 7 to 10 inclusive, pipes 95 are shown in suitable locations for accomplishing the purpose desired. It will be understood that similar arrangements may be employed with respect to the other forms disclosed. Where water spraying is utilized, those parts of the separators which become wet as a result, should preferably be made of some corrosion resistant material. The water sprayed into the inlet flow paths will flow into the hoppers and will be drained off therefrom.

Since various changes may be made in the forms of apparatus herein disclosed and in the several parts thereof and in their arrangement, and in the methods and the several steps thereof, without departing from the principle of the invention, it will be understood that no intention is entertained to limit the invention except by the scope of the appended claims.

What is claimed is:

1. The method of separating gases and solid matter carried in suspension thereby which comprises flowing a stream of the gases carrying the solid matter in a curved path of gradually diminishing area of flow to cause the solid matter to flow in the outer peripheral portion of the stream, continually separating gases from the inner peripheral portion only of the stream and causing the separated gas portions to abruptly change their direction of flow to separate them from the solid matter carried thereby, causing the remaining gases and solid matter to flow into a hopper for collecting the solid matter, and separating the said gases from the solid matter carried thereby into the hopper.

2. The method of separating gases and solid matter carried in suspension thereby which comprises flowing a stream of the gases carrying the solid matter in a curved path of gradually diminishing area of flow to cause the solid matter to flow in the outer peripheral portion of the stream, continually separating gases from the inner peripheral portion of the stream and causing the separated gas portions to abruptly change their direction of flow to separate them from the solids carried thereby, causing the remaining gases and solid matter to flow into a hopper for collecting the solid matter, and separating the said gases from the solid matter carried thereby into the hopper by causing the gases entering the hopper to abruptly change their direction of flow.

3. The method of separating gases and solid matter carried in suspension thereby which comprises flowing streams of the gases carrying the solid matter in a plurality of curved paths of flow terminating at a common point, continually separating gases from the inner peripheral portion of each stream and causing the separated gas portions to abruptly change their direction of flow to separate them from the solid matter carried thereby, causing each of the streams of gases at the common terminal point of their paths of flow to aruptly change their direction of flow, and collecting the solid matter separated from the gases.

4. The method of separating gases and solid matter carried in suspension thereby which comprises flowing streams of the gases carrying the solid matter in a pair of reversely curved paths of flow terminating at a common point, continually separating gases from the inner peripheral portion of each stream and causing the separated gas portions to abruptly change their direction of flow to separate them from the solid matter carried thereby, causing each of the streams of gases at the common terminal point of their paths of flow to abruptly change their direction of flow, and collecting the solid matter separated from the gases.

5. Apparatus for separating solid matter from gases, comprising a casing having an inlet and an outlet and arranged to provide a curved path of flow through the casing for a stream of gases and solid matter carried thereby and introduced into the inlet, means causing the gases carrying the solid matter to flow through said path, the inner wall of the curved path of flow being arranged so that portions of the gases are separated from the stream of gases passing through the path and are caused to abruptly change their direction of flow thereby concentrating the solid matter in the gases remaining in the path of flow, means for separating solid matter from the outer peripheral portion of said stream, and a hopper in communication with the end of the path of flow into which the solid matter passes and is collected.

6. Apparatus for separating solid matter from gases comprising a casing having an inlet and an outlet and arranged to provide a curved path of flow through the casing for a stream of gases and solid matter carried thereby and introduced into the inlet, means causing the gases carrying the solid matter to flow through said path, the inner wall of the curved path of flow being arranged so that portions of the gases are separated from the stream of gases passing through the path and are caused to abruptly change their direction of flow, thereby concentrating the solid matter in the gases remaining in the path of flow, and a hopper in communication with the end of the path of flow into which the solid matter and part of the gases pass and wherein the gases are separated from the solid matter and pass from the hopper to the outlet.

7. Apparatus for separating solid matter from gases comprising a casing having an inlet and an outlet and arranged to provide a curved path of flow through the casing for a stream of gases and solid matter carried thereby and introduced into the inlet, means causing the gases carrying the solid matter to flow through said path, the inner wall of the curved path of flow being arranged so that portions of the gases are separated from the stream of gases passing through the path and are caused to abruptly change their direction of flow, thereby concentrating the solid matter in the gases remaining in the path of flow, a hopper, means providing communication between the hopper and the path of flow at a point intermediate the ends of the path to permit solid matter to enter the hopper from said path, and means for separating the solid matter from said remaining gases and collecting the solid matter in the hopper.

8. Apparatus for separating solid matter from gases comprising a casing having an inlet and an outlet and arranged to provide a curved path of flow through the casing for a stream of gases and solid matter carried thereby and introduced into the inlet, means causing the gases carrying the solid matter to flow through said path, the inner wall of the curved path of flow being arranged so that portions of the gases are separated from the stream of gases passing through the path and are caused to abruptly change their direction of flow, thereby concentrating the solid matter in the gases remaining in the path of flow, a hopper, means providing communication between the hopper and the path of flow at a point intermediate the ends of the path to permit solid matter to enter the hopper from said path, and means providing communication between the hopper and the end of the path of flow.

9. Apparatus for separating solid matter from gases comprising a casing having an inlet and an outlet and arranged to provide a curved path of flow through the casing for a stream of gases and solid matter carried thereby and introduced into the inlet, means causing the gases carrying the solid matter to flow through said path, the inner wall of the curved path of flow comprising a plurality of spaced baffle plates disposed in a curved plane and with their long dimensions arranged substantially at right angles to the direction of flow of the gases flowing through the path, whereby portions of the gases are separated from the stream and flow between said plates, the faces of said plates being arranged so that the gases in passing therebetween are caused to abruptly change their direction of flow to separate out the solid matter carried thereby, whereby the solid matter is concentrated in the gases remaining in the path of flow, and a hopper at the end of the path into which the solid matter passes and is collected.

10. Apparatus for separating solid matter from gases comprising a casing having an inlet and an outlet and arranged to provide a plurality of curved paths of flow in the casing and terminating at a common point therein, means causing gases carrying solid matter introduced into the casing inlet to flow through said paths, the inner walls of said paths being arranged so that portions of the gases are separated from the streams of gases and solid matter flowing through said paths and are caused to abruptly change their direction of flow thereby concentrating the solid matter in the gases remaining in the paths of flow, and a hopper communicating with the ends of the paths of flow into which the solid matter passes and is collected.

11. Apparatus for separating solid matter from gases comprising a casing having an inlet and an outlet and arranged to provide a plurality of curved paths of flow of gradually diminishing areas of flow in the casing and terminating at a common point therein, means causing gases carrying solid matter introduced into the casing inlet to flow through said paths, the inner curved walls of said paths being arranged so that portions of the gases are separated from the streams of gases and solid matter flowing through said paths and are caused to abruptly change their direction of flow thereby concentrating the solid matter in the gases remaining in the paths of flow and a hopper communicating with the ends of the paths of flow into which the solid matter passes and is collected.

12. Apparatus for separating solid matter from gases comprising a casing having an inlet and an outlet and arranged to provide a plurality of curved paths of flow in the casing and terminating at a common point therein, means comprising a fan causing gases carrying solid matter introduced into the casing inlet to flow through said paths, the inner curved walls of said paths being arranged so that portions of the gases are separated from the streams of gases and solid matter flowing through said paths and are caused to abruptly change their direction of flow thereby concentrating the solid matter in the gases remaining in the paths of flow, and a hopper communicating with the ends of the paths of flow into which the solid matter passes and is collected.

13. Apparatus for separating solid matter from gases carrying the same, comprising a casing having an inlet and an outlet, means causing the gases introduced into the casing to flow therethrough, a hopper having its inlet connected with the casing and in which the solid matter separated from the carrying gas is collected, and means including a plurality of rows of spaced baffle plates providing a plurality of curved inlet flow paths from the inlet to the hopper, the disposition of the baffle plates in each row being such that the gases in flowing from the inlet path and between the baffle plates to the outlet are caused to abruptly change their direction of flow to thereby free said gases from the solid matter carried thereby.

14. Apparatus for separating solid matter from gases comprising a casing having an inlet and an outlet and arranged to provide a curved path of flow for gases and suspended solid matter introduced into the inlet, a plurality of spaced baffle plates bounding the inner periphery of the curved flow path and arranged with respect to the casing so that the flow path is of gradually diminishing flow area, the baffle plates being disposed so that portions of the gases flowing through the inlet path are separated and caused to abruptly change their direction of flow, a hopper in the lower portion of the casing and a partition separating the hopper and the inlet flow path, the partition being arranged to provide an opening through which separated solid matter from the flow path may enter the hopper.

15. Apparatus for separating solid matter from gases comprising a casing having an inlet and an outlet and arranged to provide a curved path of flow for gases and suspended solid matter introduced into the inlet, a plurality of spaced baffle plates bounding the inner periphery of the curved flow path and arranged with respect to the casing so that the flow path is of gradually diminishing flow area, the baffle plates being disposed so that portions of the gases flowing through the inlet path are separated and caused to abruptly change their direction of flow, a hopper in the lower portion of the casing and a partition separating the hopper and the inlet flow path, the partition being arranged to provide an opening through which separated solid matter from the outer peripheral portion of the flow path may enter the hopper.

16. Apparatus for separating solid matter from gases comprising a casing having an inlet and an outlet and arranged to provide a curved path of flow for gases and suspended solid matter introduced into the inlet, a plurality of spaced baffle plates bounding the inner periphery of the curved flow path and arranged with respect to the casing so that the flow path is of gradually diminishing flow area, the baffle plates being disposed so that portions of the gases flowing through the inlet path are separated and caused to abruptly change their direction of flow, a hopper in the lower portion of the casing and a partition separating the hopper and the inlet flow path, the partition being arranged to provide an opening at its outer peripheral portion through which separated solid matter from the flow path may enter the hopper, the partition being downwardly inclined toward the opening.

17. Apparatus for separating solid matter from gases comprising a casing having an inlet and an outlet and arranged to provide a curved path of flow for gases and suspended solid matter introduced into the inlet, a plurality of spaced baffle plates bounding the inner periphery of the curved flow path and arranged with respect to the casing so that the flow path is of gradually diminishing flow area, the baffle plates being disposed so that portions of the gases flowing through the inlet path are separated and caused to abruptly change their direction of flow, a hopper in the lower portion of the casing and a partition separating the hopper and the inlet flow path, the partition having an opening through which gases and solid matter flow from the inlet flow path into the hopper and an opening through which gases flow from the hopper to the casing outlet.

18. Apparatus for separating solid matter from gases comprising a casing having an inlet and an outlet and arranged to provide a curved path of flow for gases and suspended solid matter introduced into the inlet, a plurality of spaced baffle plates bounding the inner periphery of the curved flow path and arranged with respect to the casing so that the flow path is of gradually diminishing flow area, the baffle plates being disposed so that portions of the gases flowing through the inlet path are separated and caused to abruptly change their direction of flow, a hopper in the lower portion of the casing and a partition separating the hopper and the inlet flow path, the partition being arranged to provide an opening through which separated solid matter from the flow path may enter the hopper, the partition having an opening through which gases and solid matter flow from the inlet flow path into the hopper and an opening through which gases flow from the hopper to the casing outlet.

THOMAS B. ALLARDICE.